(12) United States Patent
Starbuck et al.

(10) Patent No.: US 7,765,208 B2
(45) Date of Patent: Jul. 27, 2010

(54) KEYWORD ANALYSIS AND ARRANGEMENT

(75) Inventors: Bryan T Starbuck, Redmond, WA (US); Gail B. Giacobbe, Seattle, WA (US); Jeffrey J Wall, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 11/146,887

(22) Filed: Jun. 6, 2005

(65) Prior Publication Data

US 2006/0277208 A1 Dec. 7, 2006

(51) Int. Cl.
*G06F 17/30* (2006.01)
*G06F 15/16* (2006.01)

(52) U.S. Cl. ...................... 707/736; 709/206
(58) Field of Classification Search .............. 707/1–10, 707/100, 101, 102; 709/218, 206
See application file for complete search history.

(56) References Cited

U.S. PATENT DOCUMENTS

| | | | | |
|---|---|---|---|---|
| 5,590,317 | A * | 12/1996 | Iguchi et al. | 707/2 |
| 5,913,215 | A * | 6/1999 | Rubinstein et al. | 707/10 |
| 5,987,457 | A * | 11/1999 | Ballard | 707/5 |
| 6,021,412 | A | 2/2000 | Ho et al. | |
| 6,067,552 | A * | 5/2000 | Yu | 715/234 |
| 6,078,913 | A * | 6/2000 | Aoki et al. | 707/2 |
| 6,094,649 | A | 7/2000 | Bowen et al. | |
| 6,141,662 | A * | 10/2000 | Jeyachandran | 707/2 |
| 6,499,030 | B1 * | 12/2002 | Igata | 707/6 |
| 6,675,197 | B1 * | 1/2004 | Satoh et al. | 709/204 |
| 6,832,244 | B1 * | 12/2004 | Raghunandan | 709/206 |
| 7,051,019 | B1 | 5/2006 | Land et al. | |
| 7,110,996 | B2 * | 9/2006 | Kawamura | 707/3 |
| 7,216,129 | B2 * | 5/2007 | Aono et al. | 707/102 |
| 7,299,222 | B1 | 11/2007 | Hogan et al. | |
| 2001/0009420 | A1 | 7/2001 | Kamiwada et al. | |
| 2002/0016787 | A1 * | 2/2002 | Kanno | 707/5 |
| 2002/0032750 | A1 * | 3/2002 | Kanefsky | 709/218 |
| 2003/0009474 | A1 * | 1/2003 | Hyland et al. | 707/102 |
| 2003/0204515 | A1 * | 10/2003 | Shadmon et al. | 707/100 |
| 2003/0217052 | A1 | 11/2003 | Rubenczyk et al. | |
| 2004/0001093 | A1 | 1/2004 | Sellers et al. | |
| 2004/0024751 | A1 | 2/2004 | Petrisor et al. | |
| 2004/0122844 | A1 * | 6/2004 | Malloy et al. | 707/102 |
| 2004/0133560 | A1 * | 7/2004 | Simske | 707/3 |
| 2004/0162834 | A1 * | 8/2004 | Aono et al. | 707/100 |
| 2004/0215626 | A1 * | 10/2004 | Colossi et al. | 707/100 |
| 2004/0230572 | A1 * | 11/2004 | Omoigui | 707/3 |
| 2004/0243622 | A1 * | 12/2004 | Morisawa | 707/102 |
| 2005/0160107 | A1 * | 7/2005 | Liang | 707/100 |
| 2005/0182628 | A1 * | 8/2005 | Choi | 704/252 |
| 2006/0028450 | A1 * | 2/2006 | Suraqui | 345/169 |

(Continued)

FOREIGN PATENT DOCUMENTS

EP 1077414 A2 2/2001

*Primary Examiner*—Neveen Abel Jalil
*Assistant Examiner*—Tarek Chbouki
(74) *Attorney, Agent, or Firm*—Lee & Hayes, PLLC

(57) ABSTRACT

Keyword analysis and arrangement are described. In an implementation, a method includes processing a plurality of items to extract a plurality of keywords contained in the items. One or more of the keywords is output for display as arranged in one or more hierarchies such that at least one of the keywords is selectable to navigate to items that are configured as emails and relate to that keyword.

21 Claims, 10 Drawing Sheets

U.S. PATENT DOCUMENTS

2006/0155539 A1* 7/2006 Chen et al. .................. 704/251
2007/0294140 A1* 12/2007 Bezos et al. .................. 705/27
2008/0071733 A1* 3/2008 Shadmon et al. ............... 707/2
2008/0249773 A1* 10/2008 Bejar et al. .................. 704/243

* cited by examiner

300

302 { Features
UI: Pictures, Attachments
Search: MS Search, Shell
   304        306

Work
Projects: Shell, Themes
Synchronization: Cell Phones
Meetings: Team, Interview

Email
Networking: Hotmail, IMAP, POP3
Customers: MVPS, Newsgroups
Security: Patch, Service Pack
APIs: SDK, NameSpace

Personal
Vacation: Europe, UK, London, Paris
San Diego: Tom, Kris, Nancy
Football: Schedules, Scores

*Fig. 3*

KEYWORD ANALYSIS AND ARRANGEMENT

TECHNICAL FIELD

The present invention generally relates to keywords and more particularly relates to keyword analysis and arrangement of electronically-stored items.

BACKGROUND

Message communication has become and continues to be one of the most prevalent uses of computing devices, such as personal computers, wireless phones, and so on. For example, users may communicate, one to another, through the use of email, i.e., electronic mail. Email employs standards and conventions for addressing and routing such that the email may be delivered across a network, such as the Internet, utilizing a plurality of devices. Thus, users may receive email from over a company intranet and even across the world using the Internet The amount of email that is received by the user is ever increasing, however, and may consequently hinder the user's efficiency in dealing with each email. From work to personal use, for instance, users of email are increasingly exposed to larger and larger numbers of emails in a given day. Additionally, the user may not be able to readily differentiate between these different uses of email, and therefore not readily navigate to particular emails of interest. Further, these emails have ever increasing importance as users have come to trust and rely on email to receive a variety of content from bills to pictures of loved ones.

Therefore, there is a continuing need for techniques that may be employed to improve message communication and navigation.

SUMMARY

Keyword analysis and arrangement are described. In an implementation, a method includes processing a plurality of items to extract a plurality of keywords contained in the items. One or more of the keywords is output for display as arranged in one or more hierarchies such that at least one of the keywords is selectable to navigate to items that are configured as emails and relate to that keyword.

In another implementation, a method includes extracting a plurality of keywords from a plurality of items on a client device and creating hierarchies from the plurality of keywords. A collection of the items on the client device is categorized based on words contained in the respective items according to the created hierarchies.

In a further implementation, a method includes mapping closeness between a plurality of keywords extracted from a plurality of items, one to another, and forming a plurality of groupings of the keywords based on the mapped closeness. The plurality of groupings are combined until a predetermined number of groupings remain and one or more of the keywords corresponding to the plurality of grouping are output such that each keyword, when output, is configured to navigate to one or more corresponding items.

BRIEF DESCRIPTION OF THE DRAWINGS

FIG. 3 is an illustration in an exemplary implementation showing a keyword user interface configured to display a plurality of keywords from a plurality of hierarchical levels of a keyword hierarchy.

The same reference numbers are utilized in instances in the discussion to reference like structures and components.

DETAILED DESCRIPTION

Overview

Messages, such as email, are voluminous and consequently need better organization in order to enable a recipient of the messages to locate particular messages of interest. In a variety of implementations, techniques are described which may be utilized to organize email and other items, such as contacts, documents, instant messages, appointments, and so on. For example, a keyword extraction technique may be utilized to create a keyword index of stored emails and present a display of keywords in a user interface to allow the user to navigate to the emails and other items via the displayed keywords. For instance, an algorithm may be utilized to map out the closeness between keywords in emails and other items. Keywords, that have closeness values over a threshold may then be grouped together to create hierarchies of keywords. These hierarchies may be provided in a variety of ways, such as through 3-6 keyword "islands" (i.e., groups) that categorize a user's email.

Sub-categories of the islands may also be displayed to the user to allow the user to select a more specific keyword view of the categorized email. If the user is looking for a security patch, for example, the user may select the keyword "security" and emails having the keyword "security" are then retrieved and displayed for viewing by the user. This navigation technique may continue "down" through the hierarchy until the user locates the particular email of interest, such as by selecting another keyword "patch" for navigation to emails having the words "security" and "patch". Although email has been described, these navigation techniques may be utilized for a variety of electronically-storable items, such as contacts (e.g., electronically-stored names and addresses), appointments, documents, and so on.

In the following discussion, an exemplary environment is first described which is operable to employ keyword organizational techniques. Exemplary procedures and user interfaces are then described which are operable in the exemplary environment to provide the keyword organization techniques, as well as in other environments.

Exemplary Environment

Figure 1:
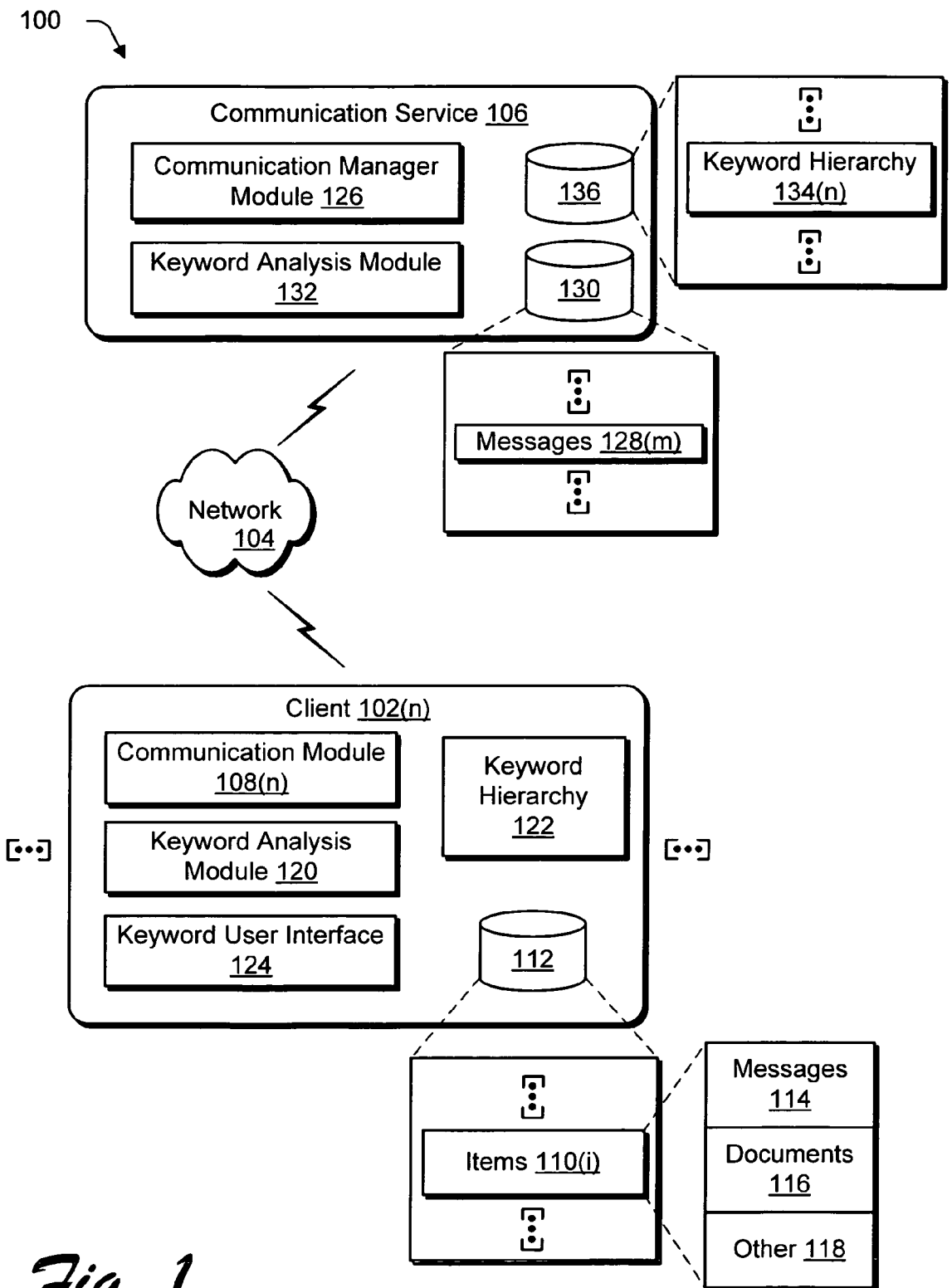
FIG. 1 is an illustration of an environment in an exemplary implementation that is operable to employ keyword organizational techniques.

FIG. 1 is an illustration of an environment 100 in an exemplary implementation that is operable to employ keyword organizational techniques. The environment 100 is illustrated as including a plurality of clients 102($n$) (where "n" can be any integer form one to "N") that are communicatively coupled, one to another, over a network 104. The plurality of clients 102($n$) may be configured in a variety of ways. For example, one or more of the clients 102($n$) may be configured as a computer that is capable of communicating over the network 104, such as a desktop computer, a mobile station, a game console, an entertainment appliance, a set-top box communicatively coupled to a display device, a wireless phone, and so forth. The clients 102($n$) may range from full resource devices with substantial memory and processor resources (e.g., personal computers, television recorders equipped with hard disk) to low-resource devices with limited memory and/or processing resources (e.g., traditional set-top boxes). In the following discussion, the clients 102($n$) may also relate to a person and/or entity that operate the client. In other words, the clients 102($n$) may describe a logical client that includes a user and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, a collection of the plurality of clients 102($n$) may be coupled via a peer-to-peer network to communicate, one to another. Each of these clients may also be communicatively coupled to a communication service 106 over the Internet. A variety of other examples are also contemplated.

Each of the plurality of clients 102($n$) is illustrated as including a respective one of a plurality of communication modules 108($n$). In the illustrated implementation, each of the plurality of communication modules 108($n$) is executable on a respective one of the plurality of clients 102($n$) to send and receive messages. For example, one or more of the communication modules 108($n$) may be configured to send and receive email. As previously described, email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header and a user-specified payload, such as text and attachments, e.g., documents, computer-executable files, and so on. The header contains technical information about the source and oftentimes may describe the route the message took from sender to recipient.

In another example, one or more of the communication modules 108($n$) may be configured to send and receive instant messages. Instant messaging provides a mechanism such that each of the clients 102($n$), when participating in an instant messaging session, may send text messages to each other. The instant messages are typically communicated in real time, although delayed delivery may also be utilized, such as by logging the text messages when one of the clients 102($n$) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received. Although messages configured as instant messages and emails have been described, messages may assume a variety of other configurations without departing from the spirit and scope thereof.

Each of the plurality of clients 102($n$) is illustrated as having a plurality of items 110($i$), where "i" can be any integer from one to "I", electronically stored in storage 112. The items 110($i$) may be configured in a variety of ways. For example, one or more of the items may be configured as messages 114 (e.g., email, instant messages, voicemail, and so on), documents 116, and other 118 electronically-storable data. As previously described, the quantity of items 110($i$) may become quite voluminous. For instance, the client 102($n$) may store thousands of email messages alone, as well as instant messages, documents, and so forth. In order to organize the plurality of items 110($i$), the client 102($n$) may employ a keyword analysis module 120 that is executable to generate a keyword hierarchy 122 for output in a keyword user interface 124.

The keyword analysis module 120 is representative of functionality which is executable to examine the plurality of items 110($i$), and more specifically words within the items 110($i$), to determine the "meaning" of each of the items. The items may then be arranged accordingly to a keyword hierarchy 122 for output in the keyword user interface 124. Therefore, when a user of the client 102($n$) wants to locate a specific item from the plurality of items 110($i$), but does not remember a specific name, date and so on of the item, the user can navigate through keywords in the keyword hierarchy 122 to locate the desired item. In this way, the plurality of items 110($k$) provide a "snapshot" of the world of the respective client 102($n$) which may be utilized to categorize items 110($i$) on the client 102($n$). This may be utilized in a variety of ways. For example, the keyword analysis module 120 may analyze each of the plurality of items 110($i$) on the client 102($n$) to generate a keyword hierarchy 122 which is then utilized to organize messages of the client 102($n$). Thus in this example, the "meaning" of the plurality of items 110($i$) is used to organize a collection of the items, further discussion of which may be found in relation to FIG. 6.

Although execution of the keyword analysis module 120 on the client 102($n$) has been described, the communication service 106 may also employ similar functionality. For example, the communication modules 108(1)-108(N) communicate with each other through use of the communication service 106. The communication service 106 is illustrated as including a communication manager module 126 (hereinafter "manager module") which is executable to route messages between the communication modules 108(1)-108(N). In an implementation, the communication service 106 may be configured to store and route email, such as through configuration as an email provider. For instance, one of the plurality of clients 102($n$) may execute a respective communication module 108($n$) to form an email for communication to another one of the plurality of clients 102($n$). The communication module 108($n$) communicates the email to the communication service 106, which is then stored as one of a plurality of messages 128(*m*), where "m" can be any integer from one to "M", which are stored in storage 130. The other client, to retrieve the email, "logs on" to the communication service 106 (e.g., by providing user identification and password) and retrieves emails from a corresponding account. In this way, the other client may retrieve corresponding emails from one or more of the plurality of clients 102(*n*) that are communicatively coupled to the communication service 106 over the network 104. Although messages configured as emails have been described, a variety of textual and non-textual messages (e.g., graphical messages, audio messages, and so on) may be communicated via the communication service 106 without departing from the sprit and scope thereof.

The communication service 106, through access to the plurality of messages 128(*m*) for each of the respective clients 102(*n*), also has access to a "snapshot" of the respective client's world. Therefore, the communication service 106 may execute a keyword analysis module 132 to generate a keyword hierarchy 134(*n*) for each of the plurality of clients 102(*n*), which are illustrated as stored in storage 136. These keyword hierarchies 134(*n*) may then be communicated from the communication service 106 to each of the respective clients 102(*n*) for output in a respective keyword user interface 124. Although a communication service 106 has been described, a variety of services may be utilized to generate keyword hierarchies for organization of items in keyword hierarchies for communication over a network 104 to the clients 102(*n*) based on items which correspond to the respective clients 102(*n*), such as any service that stores client data.

Generally, any of the functions described herein can be implemented using software, firmware (e.g., fixed logic circuitry), manual processing, or a combination of these implementations. The terms "module" and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the keyword analysis and arrangement techniques described below are platform-independent, meaning that the techniques may be implemented on a variety of commercial computing platforms having a variety of processors.

Figure 2:
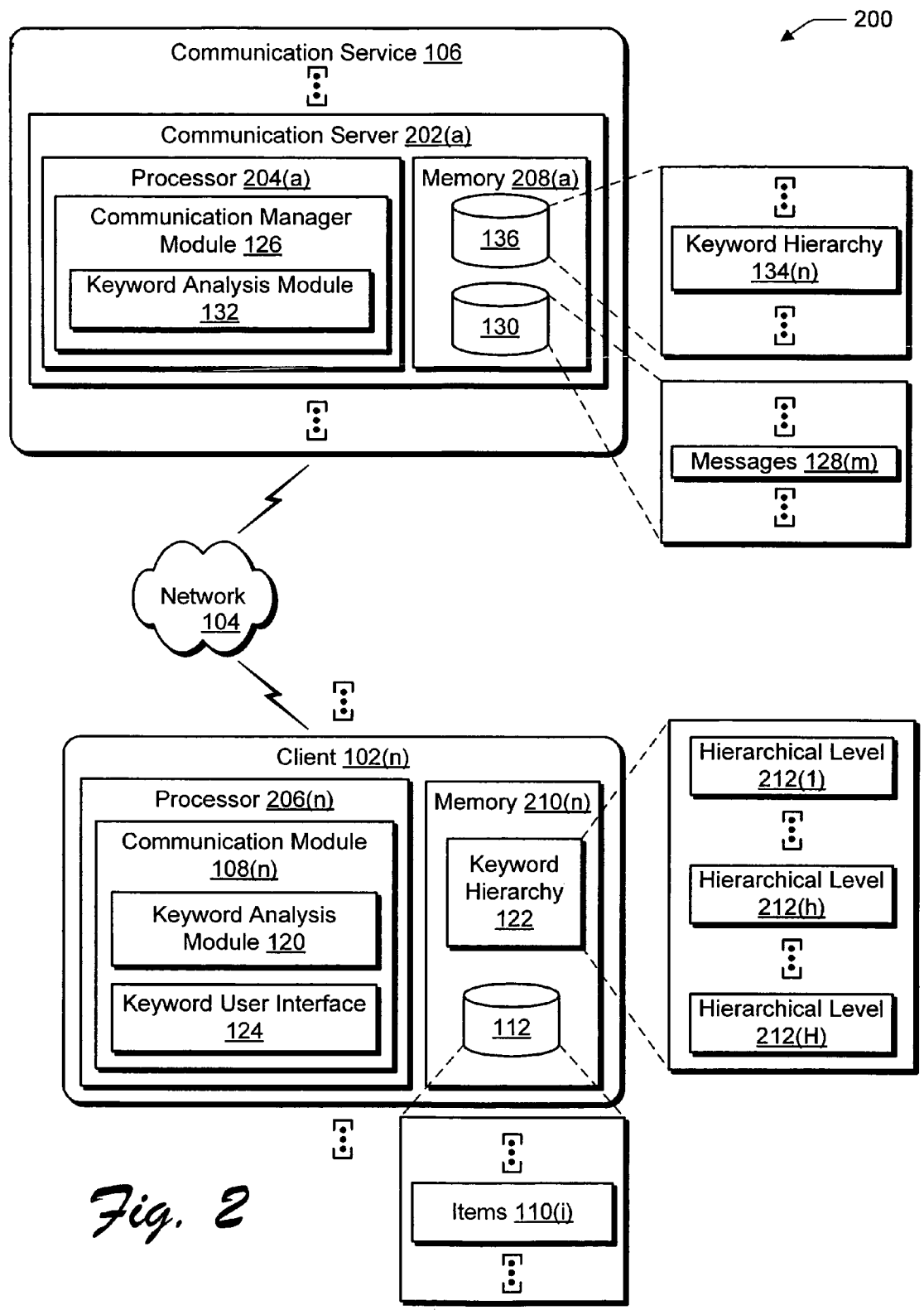
FIG. 2 is an illustration of a system in an exemplary implementation showing a plurality of clients and a communication service of FIG. 1 in greater detail.

FIG. 2 is an illustration of a system 200 in an exemplary implementation showing the plurality of clients 102(*n*) and the communication service 106 of FIG. 1 in greater detail. The communication service 106 is illustrated as being implemented by a plurality of communication servers 202(*a*) (where "a" can be any integer from one to "A") and the client 102(*n*) is illustrated as a client device. The communication servers 202(*a*) and the client 102(*n*) are each illustrated as having a respective processor 204(*a*), 206(*n*) and a respective memory 208(*a*), 210(*n*).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(*a*), 210(*n*) is shown, respectively, for the communication servers 202(*a*) and the clients 102(*n*), a wide variety of types and combinations of memory may be employed, such as random access memory (RAM), hard disk memory, removable medium memory, and so forth. For example, the keyword hierarchy 122 may be stored in RAM and the storage 112 for the plurality of items 110(*i*) may be implemented by one or more hard disk drives.

The keyword analysis module 120 and the keyword user interface 124 are illustrated in FIG. 2 as included within the communication module 108(*n*) to indicate that the communication module may employ this functionality. The keyword analysis module 120, when executed, may calculate keywords for each of the plurality of items 110(*i*) stored on the client 102(*n*) to define its respective primary "meaning". The keyword analysis module 120 may then create links between the items 10(*i*) to each keyword in the keyword hierarchy 122. References to people in the items 110(*i*) may also be treated as keywords. For instance, such "people" keywords may be indicated as such differently in the keyword user interface 124 than other "non-people" keywords, further discussion of which may be found in relation to FIG. 10.

The plurality of keywords generated by the keyword analysis module 120 through analysis of the plurality of items 110(*i*) may be arranged in one or more of a plurality of hierarchical levels 212(1), ..., 212(*h*), ..., 212(H) of the keyword hierarchy 122. This analysis may be performed in a variety of ways. For example, the keyword analysis module 120 may examine each of the plurality of items 10(*i*) to derive a group of keywords. The keywords may then be arranged in the plurality of hierarchical levels based on the number of occurrences of each of the keywords, one to another. Links from the keywords to the plurality of items 110(*i*) may be created such that when the plurality of hierarchical levels 212(1)-212(H) are displayed in the keyword user interface 124, a user of the client 102(*n*) of FIG. 2 may navigate to the items 110(*i*) having the keywords. In another example, a subset of the vocabulary utilized by the plurality of items 10(*i*) that is "meaningful" is generated, further discussion of which may be found in relation to FIG. 7. In a further example, keyword phrases that include a plurality of keywords are generated, further discussion of which may be found in relation to FIG. 8. A variety of other examples are also contemplated.

The keyword user interface (UI) 124 may then display the keyword hierarchy 122 for viewing by a user. The keyword UI 124 may be configured in a variety of ways. For instance, the keyword UI 124 may include functionality such that the client 102(*n*) may toggle between people keywords, non-people keywords, and both. The client 102(*n*) may also use the keyword UI 124 to "drill down" into subcategories (e.g., "child" hierarchical levels) to find a specific keyword and see items that map to that specific keyword. The keywords in the keyword hierarchy 122, as displayed in the keyword UI 124, may also be selectable such that keywords in different "branches" of the keyword hierarchy 122 may be combined to search for a particular item. In this way, the keyword UI 124 may be utilized to "triangulate" to a specific topic represented by a collection of keywords, further discussion of which may be found in relation to FIG. 5. Thus, the keyword user interface 124 provides a technique for the client 102(*n*) to navigate through a large number of items (e.g., over 10 million) to a subset of the items (e.g., from 1 to 30 items) within one to four selections, e.g., "clicks" in the keyword user interface 124, in a way that is readily understood by the client 102(*n*). The keyword user interface 124 may be configured in a variety of ways, illustration of which may be found in relation to the following FIGS. 3-5.

Exemplary User Interfaces

FIG. 3 is an illustration in an exemplary implementation showing a keyword user interface 300 configured to display a plurality of keywords from a plurality of hierarchical levels of a keyword hierarchy. The keyword UI 300 provides a display of a plurality of keywords that are arranged into hierarchical levels. For example, the keyword "features" is a root level of a hierarchy that is a parent to another keyword "search". Thus, the keyword "search" is positioned in a hierarchical level 304 that is a "child" of the root level 302. Likewise, the keywords "MS Search" and "Shell" are positioned in another hierarchical level 306 that is a child to the previous child hierarchical level having the keyword "search".

As shown in FIG. 3, a plurality of hierarchies may be displayed, which are illustrated as "features", "work", "email" and "personal". Each of these hierarchies further display multiple keywords which are positioned at different respective levels of the hierarchy. In this way, a user, when viewing the user interface, may see multiple branches of different hierarchies of keywords utilized for categorizing items.

Figure 4:
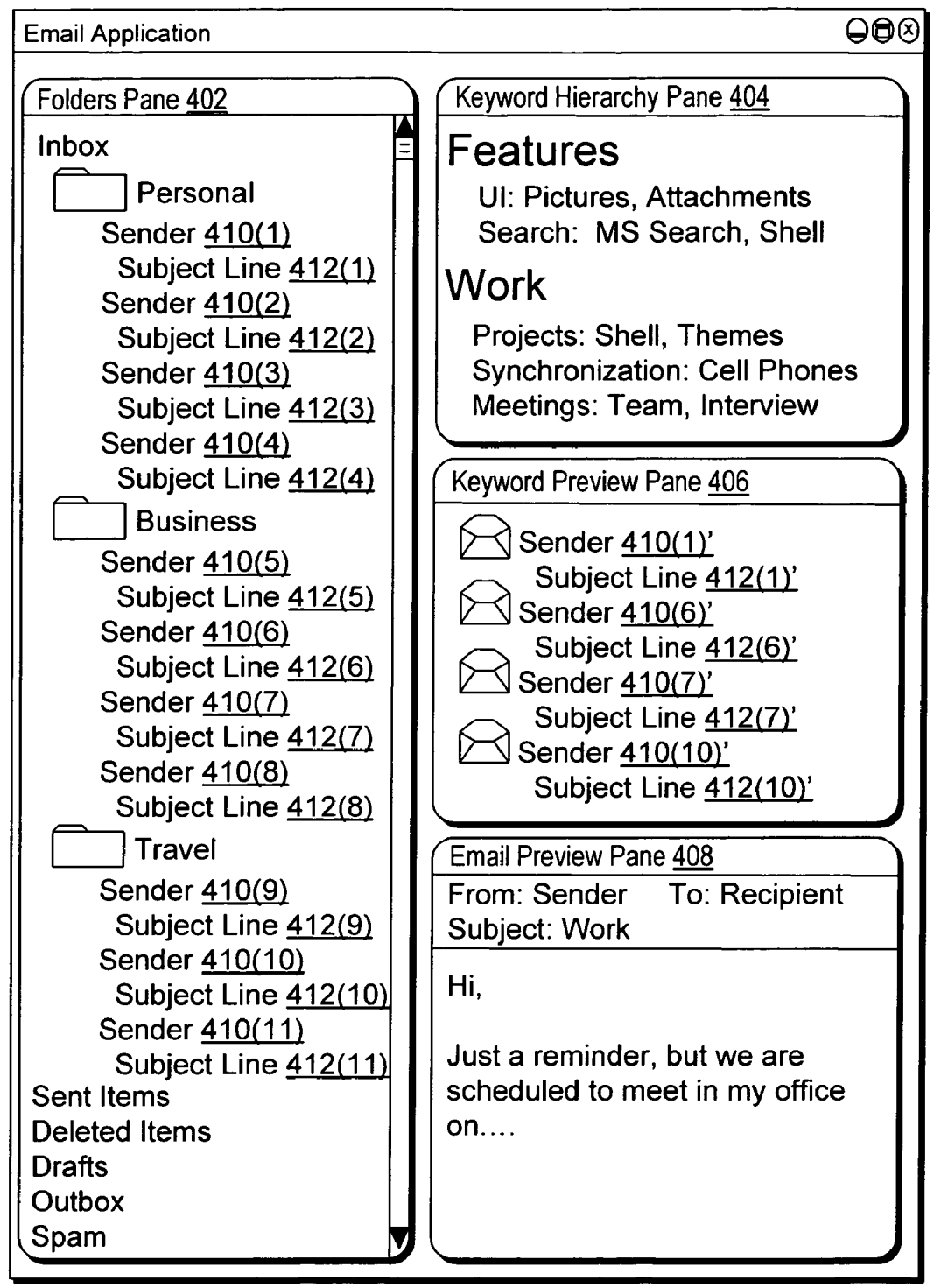
FIG. 4 is an illustration in an exemplary implementation showing an email user interface which includes the keyword user interface of FIG. 3 as organizing a plurality of emails according to a keyword hierarchy.

FIG. 4 is an illustration in an exemplary implementation showing an email user interface 400 which includes the keyword user interface 300 of FIG. 3 as organizing a plurality of emails according to a keyword hierarchy. The email user interface includes a folders pane 402, a keyword hierarchy pane 404, a keyword preview pane 406 and an email preview pane 408.

The folders pane 402 includes representations of a plurality of folders which may be utilized to organize email, the illustrated examples including an "inbox", "sent items", "deleted items", "drafts", "outbox" and "spam". These folders may also include sub-folders, the illustrated examples including "personal", "business" and "travel". The sub-folders in this example include a plurality of representations of email messages, each of which having a respective sender 410(1)-410(11) line and a respective subject line 412(1)-412(11).

The keyword hierarchy pane 404 includes a portion of the user interface 300 of FIG. 3. Email messages that correspond to keywords selected in the keyword hierarchy pane 404 are displayed in the keyword preview pane 406. For instance, email messages having the respective sender 410(1), 410(6), 410(7), 410(10) and subject lines 412(1), 412(6), 412(7), 412(10) are displayed in the keyword preview pane as having sender lines 410(1)', 410(6)', 410(7)', 410(10)' and subject lines 412(1)', 412(6)', 412(7)', 412(10)'. Thus, the client may navigate through the keyword hierarchy pane 404 and have results of that navigation displayed concurrently in the keyword preview pane 406. Further, a message in the keyword preview pane 406 may be selected to display at least a portion of its contents in the email preview pane 408.

Figure 5:
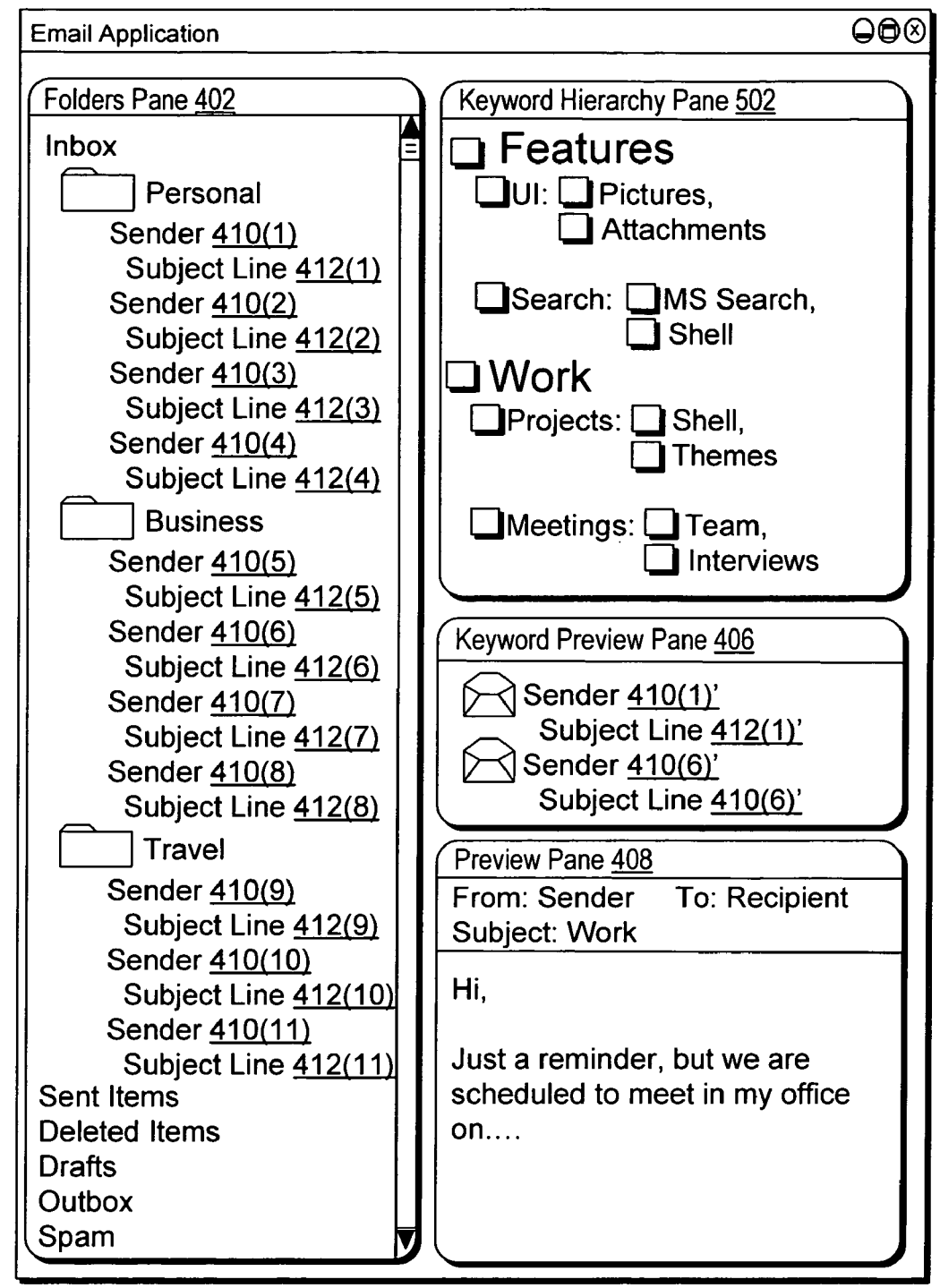
FIG. 5 is an illustration in an exemplary implementation showing an email user interface which includes the keyword user interface of FIG. 3 as organizing a plurality of emails according to a keyword hierarchy such that a plurality of the keywords are selectable to navigate to emails having the selected keywords.

FIG. 5 is an illustration in an exemplary implementation showing an email user interface 500 which includes the keyword user interface 300 of FIG. 3 as organizing a plurality of emails according to a keyword hierarchy such that a plurality of the keywords are selectable to navigate to emails having the selected keywords. Like the user interface 400 of FIG. 4, the user interface 400 includes a folders pane 402 for display of folders for storing email, a keyword preview pane 406 for displaying a result of navigation through a keyword hierarchy pane 502, and a preview pane 408 for display of messages selected in the keyword preview pane 406 and/or the folders pane 402.

The keyword hierarchy pane 502 of the user interface 500 of FIG. 5 is configured to accept a plurality of selections (e.g., through use of a cursor control device) by the client of keywords at any one time to navigate to emails having one or more of the selected keywords. The keyword hierarchy pane 502 is illustrated as including a "check box" for each keyword included in the keyword hierarchy pane 502. By selecting a keyword, the keyword preview pane 406 may "navigate to" to emails having that keyword. Likewise, by unselecting a selected keyword, the keyword preview pane 406 may "navigate from" emails having that keyword. Thus, the client may simply "click" through the displayed keyword to navigate through the emails to locate a particular email of interest. In an implementation, indications may be provided by each of the results to indicate a "closeness" of the item to the selected keywords, such as by displaying varying numbers of stars.

Although navigation through email has been described, similar functionality may be employed for other electronically-storable items, such as appointments, contacts, documents, and so on. Therefore, although the following procedures will be described in instances in an email environment, a variety of other environments are also contemplated without departing from the spirit and scope thereof.

Exemplary Procedures

The following discussion describes keyword analysis and arrangement techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2 and the user interfaces 300, 400, 500 of FIGS. 3-5.

Figure 6:
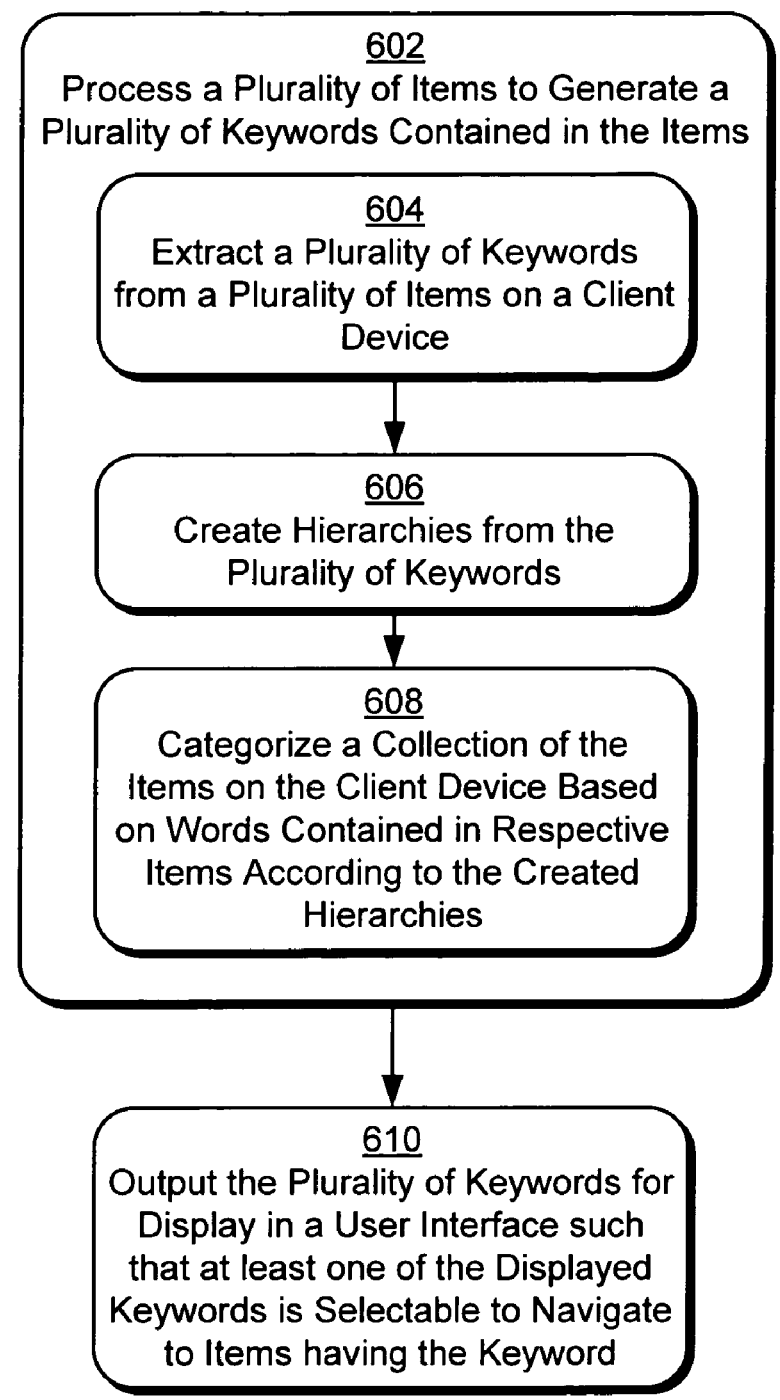
FIG. 6 is a flow diagram depicting a procedure in an exemplary implementation in which a plurality of items is processed to generate a display of keywords for navigation to items having the keywords.

FIG. 6 is a flow diagram depicting a procedure 600 in an exemplary implementation in which a plurality of items are processed to generate a display of keywords for navigation to items having the keywords. A plurality of items is processed to generate a plurality of keywords contained in the items (block 602). For instance, the client 102(n) includes a plurality of items configured as messages 114 (e.g., emails and instant messages), documents 116, and other 118 electronically-storable items. These items 110(i) may be utilized to describe the client's 102(n) environment, such as words commonly encountered by the client 102(n) and how those words are utilized, e.g., in relation to other words in the items 110(i). Therefore, the items 110(i) stored on the client 102(n) may be utilized to give a context to the items, and consequently an organizational structure for navigating through the items.

For example, during the processing, the keyword analysis module 120 may extract a plurality of keywords from a plurality of items on a client device (block 604). For instance, the keyword analysis module 120 may generate a dictionary describing each word contained in the plurality of items 110(i) and the number of occurrences of each of the words. Hierarchies may then be created from the plurality of keywords (block 606). A determination may be made, for instance, as to the "closeness" of each of the plurality of keywords, one to another. This closeness may be utilized to construct a plurality of hierarchical levels and arrange keywords within those levels in parent/child relationships, such as "feature", "search" and "MS Search" as depicted in FIG. 3.

The keyword analysis module 120 (and/or the communication module 108(n)) may then categorize a collection of the items on the client device based on word contained in the respective items and according to the created hierarchies (block 608). For instance, a subset of the items may be categorized according to the hierarchy created for the plurality of items stored on the client 102(n). Thus, the arrangement of the emails in the subset (e.g., the emails) in this instance may be dependent at least in part on other items stored on the client. A variety of other processing techniques may also be employed, further discussion of which may be found in relation to FIGS. 7-10.

The plurality of keywords are then output for display in a user interface such that at least one of the displayed keywords is selectable to navigate to items having the keyword (block 610). For instance, the plurality of keywords in the keyword hierarchy 134(n) may be displayed as shown in the keyword hierarchy pane 404 of the user interface 400 of FIG. 4. The displayed keywords are selectable to cause items corresponding to the keyword to be output for display in the keyword preview pane 406. In this way, the client may navigate through the items using the keywords arranged in the hierarchy. A variety of other techniques may also be utilized for selection of keywords, further discussion of which may be found in relation to FIG. 10.

Figure 7:
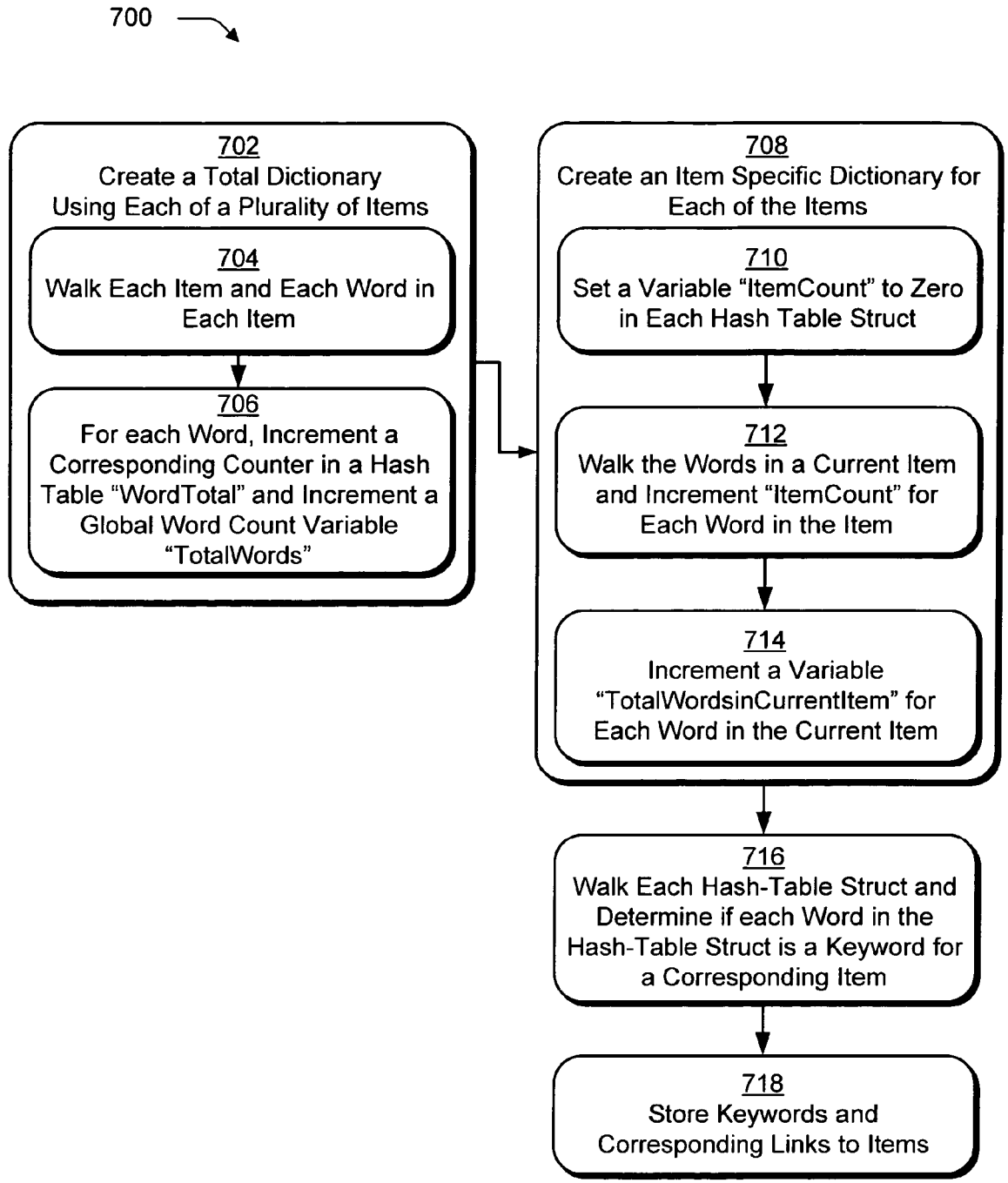
FIG. 7 is a flow diagram depicting a procedure in an exemplary implementation in which a keyword lexicon having a subset of words contained in a plurality of items is calculated from the plurality of items.

FIG. 7 is a flow diagram depicting a procedure 700 in an exemplary implementation in which a keyword lexicon having a subset of words contained in a plurality of items is calculated from the plurality of items. A total dictionary is created using each of a plurality of items (block 702). For example, each item and each word in each item is walked (block 704). For each word, a corresponding counter in a hash table is incremented and a global word count variable is also incremented (block 706). Thus, once each of the items is walked, a dictionary is obtained which describes each of the words in each of the items.

An item specific dictionary for each of the items is then created (block 708) by re-walking each item. First, a variable "ItemCount" is set to zero in each hash table struct (block 710). A "struct" is short for "structure", which is a programming term meaning a data group having related variables. An item is then set as "current" and the words in the current item are walked, incrementing the variable "ItemCount" for each word in the item (block 712). Additionally, a variable "TotalWordsinCurrentItem" is incremented for each word in the current item (block 714).

Once each of the items is walked, each hash-table struct is walked to determine if each word in the hash-table struct is a keyword for a corresponding item (block 716). For instance, a hash-table word may be considered a keyword for that item if a ratio of "ItemCount/TotalWordsinCurrentItem" to "WordTotal/TotalWords" exceeds a threshold. Based on this determination, the keywords are stored with links to corresponding items (block 718). In an implementation, if the number of keywords per item is limited by another threshold.

Figure 8:
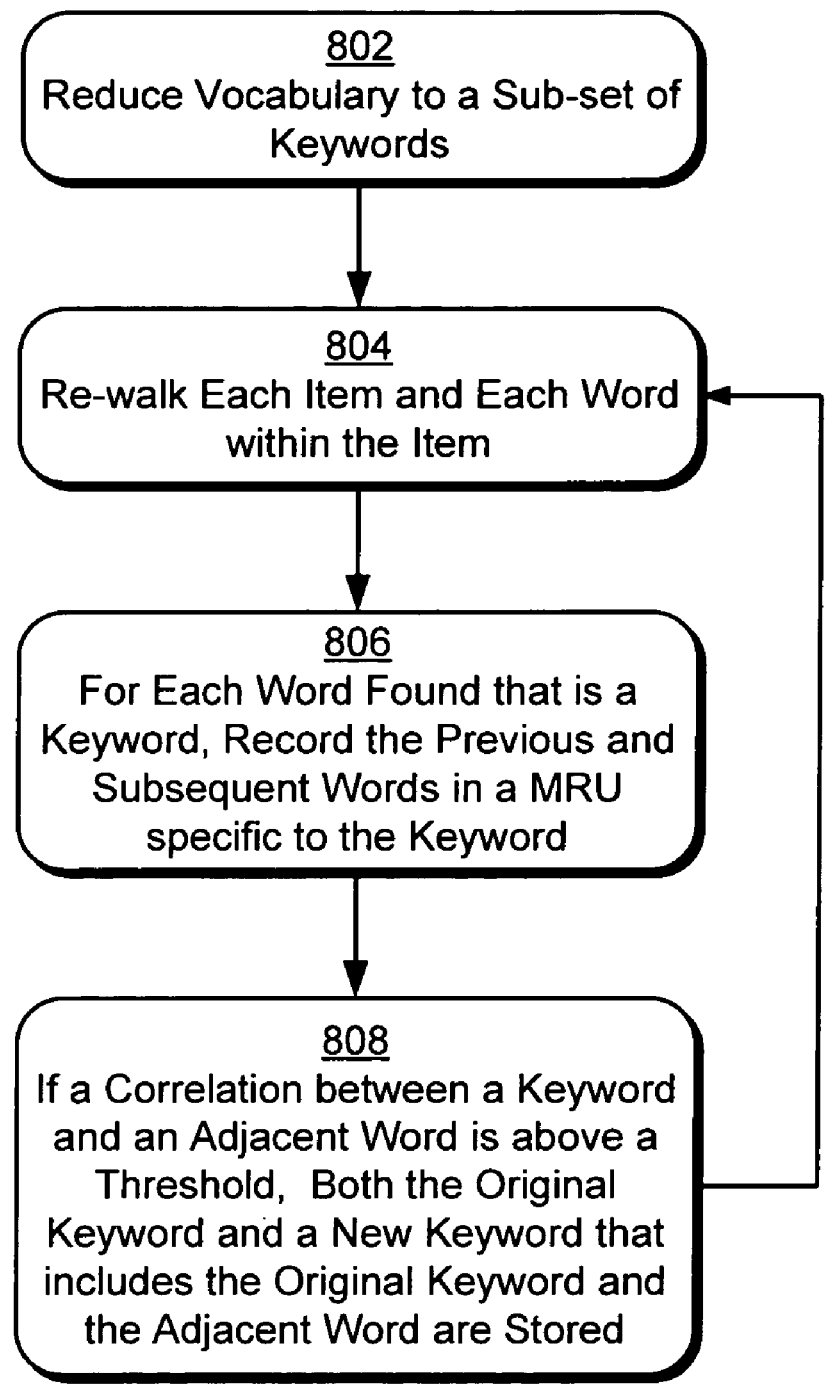
FIG. 8 is a flow diagram depicting a procedure in an exemplary implementation in which keyword phrases having multiple keywords are generated from a plurality of items for use in configuring a keyword hierarchy.

FIG. 8 is a flow diagram depicting a procedure 800 in an exemplary implementation in which keyword phrases having multiple keywords are generated from a plurality of items for use in arranging a keyword hierarchy. A vocabulary of words included in a plurality of items is reduced to a subset of keywords (block 802). For instance, the method 700 of FIG. 7 may be employed to create a subset of keywords as previously described.

Each item and each word within the item is re-walked (block 804). For each word that is a keyword, the previous and subsequent words are recorded in a minimal revisable unit (MRU) that is specific to the keyword (block 806). In an implementation, the word before or after the keyword is skipped if the keyword is at the beginning or end of a sentence.

If a correlation between a keyword and an adjacent word is above a threshold, then both the original keyword and a new keyword (e.g., keyword phrase) that included the original keyword and the adjacent word are stored (block 808). This procedure 800 may be repeated to obtain keyword phrases having three or more keywords (e.g., blocks 804-808). Thus, keyword phrases having multiple keywords may also be utilized to organize items, such as "MS Search" as depicted in FIGS. 3-5.

Figure 9:
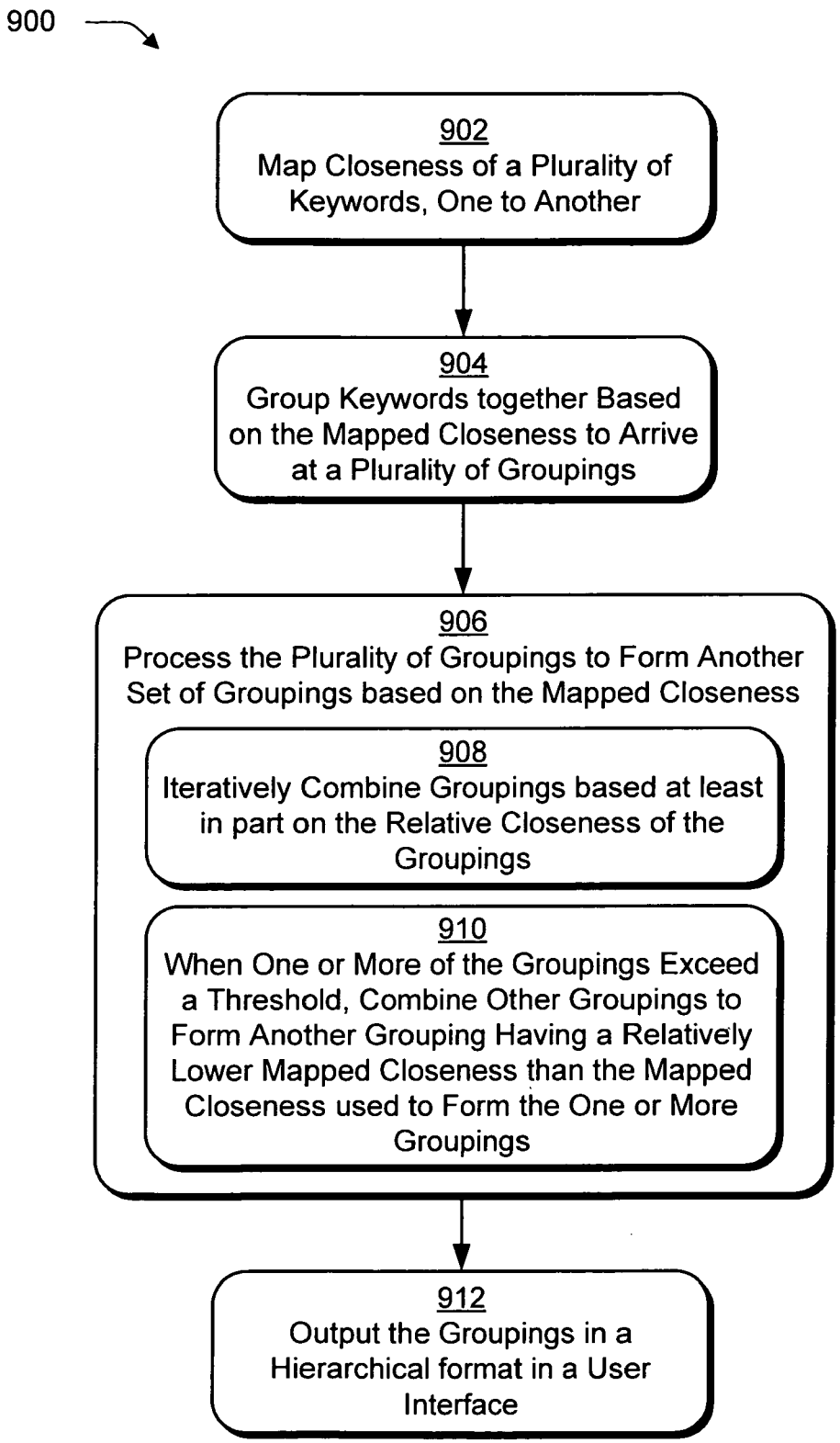
FIG. 9 is a flow diagram depicting a procedure in an exemplary implementation in which a keyword hierarchy is calculated.

FIG. 9 is a flow diagram depicting a procedure 900 in an exemplary implementation in which a keyword hierarchy is calculated. In an implementation, it is desirable to group items into a few "high level" categories, e.g., three to six categories. Additional hierarchical levels are then created which may each further subdivide into smaller categories. Keywords may be utilized to provide each of these categories and links provided from the keyword to items having the keyword. In this way, the keywords may be utilized to navigate to items having the keyword as previously described.

Closeness is mapped for a plurality of keywords, one to another (block 902). The keywords are then grouped together based on the mapped closeness to arrive at a plurality of groupings (block 904). For instance, the plurality of keywords may be "latched" together to form a multitude of small groupings, with most containing two keywords.

The plurality of groupings is then processed to form another set of groupings based on the mapped closeness (block 906). For example, the keyword analysis module 120 may iteratively combine groupings based at least in part on the closeness of the groupings (block 908). When one or more of the groupings exceed a threshold, other groupings are combined to form another grouping having a relatively lower mapped closeness than the mapped closeness used to form the one or more groupings (block 910). In this way, the keyword analysis module 120 may prevent one or more of the groupings from including an inordinate number of keywords, thereby approximately balancing the groupings, one to another. The groupings are then output in a hierarchical format in a user interface (block 912). A variety of algorithms and techniques may be utilized to perform generate these groupings.

The procedure 900 of FIG. 9, for example, may be utilized to generate a list of keywords for each item and may be arranged in order of priority. A number of divisions (e.g., categories) is then determined for creation at a "top level" of the hierarchy, such as three to six categories.

A hash table of the keywords is created, each of which including the following data:
"ItemswithTopKeyword", which represents a number of items having this keyword as the "top" (i.e., root) keyword;
"ItemsKeywordRank", which represents a number of a sum of ranks of items that have this keyword, the rank for an item depends on "how high" the keyword is prioritized for an item;
"Keyword * TopAdjacentKeyword", which points to the keywords that are most likely included in items with this as a primary keyword, this may be ordered in an array where array index 0 is more likely that 1, 1 is more likely than 2, and so on; and
"Dword * TopAdjacentKeywordsCloseness", which stores closeness values for each of the top adjacent keyword, which is described in greater detail below.

For each keyword, the following steps are repeated to create a closeness value for each value in "TopAdjacentKeywords". First, a number of points which refer to the keyword is computed and an inertia of 10,000 is utilized to start. Each "TopAdjacentKeywords" keyword is walked and inertia is divided by three for each array index in "TopAdjacentKeywords" that is entered. Further, a calculation is made to divide by three for each step in distance the keyword is located away from the home keyword. Two or three steps away from the home keywords are then taken. Each time a "TopAdjacentkeyword" value points back to a home keyword, the current inertia is added to the closeness value.

An ordered closeness list is then created from the closeness values computed above and structs are inserted into the ordered list. A keyword pointer is used to point to the corresponding keyword struct and a "TotalCloseness" value is utilized to represent a sum of values in "TopAdjacentKeywordsCloseness". The structs are inserted in an order depending on their corresponding "TotalCloseness" values, from largest to smallest. Further, "TopAdjacentKeywordsCloseness" values are added in each direction.

"Islands" (i.e., groups) are then created from the keywords based on the closeness values. For instance, a variable "CurrentIslands" is set to one. The following steps are then repeated. A first item in the ordered closeness list is selected along with the closest keyword, based on "TopAdjacentKeywordsCloseness", both of which are set to "CurrentIslands". If one of the two keywords already has a variable "Island" set, that value is used instead. If both keywords have the variable "Island" set, then the lowest value of the two is used. Each obsolete "Island" value is replaced. If "CurrentIslands" is used, then "CurrentIslands ++" is performed. In an implementation, a look aside value is used for "Island" values. Further, a total may be kept of keywords which are tied to each island such that none of the "top" islands include an inordinate number of keywords. In this example, the previous step "widdles" the number of islands down to a desired three to six range which is a final result of the top level of the hierarchy. These steps may be repeated within any one level of the hierarchy such that each level of the hierarchy is "balanced". A variety of other techniques may be utilized to balance the islands of the hierarchy without departing from the spirit and scope thereof.

Figure 10:
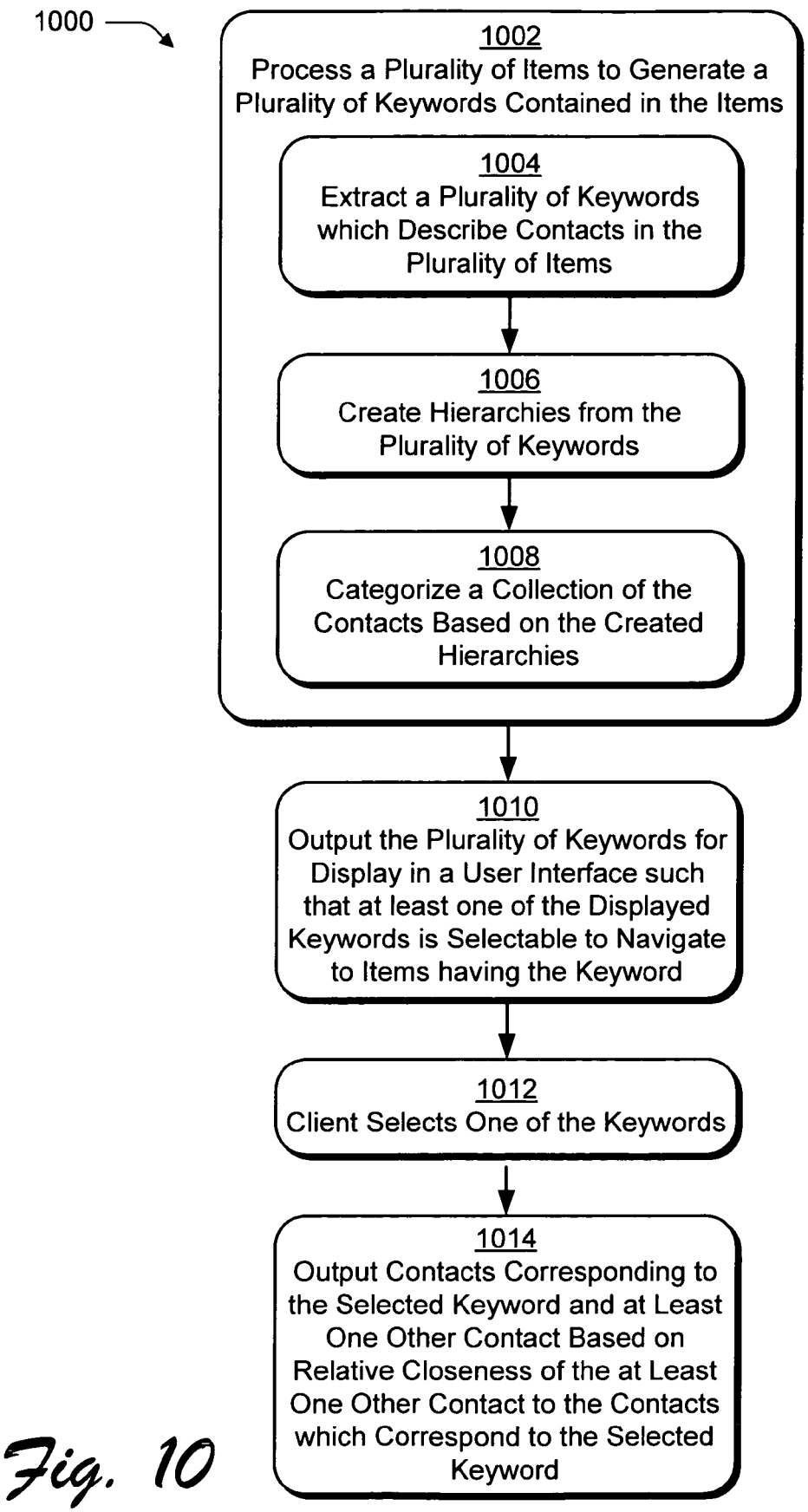
FIG. 10 is a flow diagram depicting a procedure in an exemplary implementation in which contacts are organized according to a keyword hierarchy.

FIG. 10 is a flow diagram depicting a procedure 1000 in an exemplary implementation in which contacts are organized according to a keyword hierarchy. In the previous examples, emails were arranged according to a keyword hierarchy. However, the keyword analysis and arrangement techniques may be utilized for a variety of other items.

For example, a plurality of items may be processed to generate a plurality of keywords contained in the item (block 1002). As before, a variety of items may be examined, such as documents, emails, appointments, contacts, instant messages, and so on. However, in this instance a plurality of keywords are extracted which describe contacts in the plurality of items (block 1004), which are used to create hierarchies (block 1006). A collection of the items (in this instance contacts) are then categorized based on the created hierarchies (block 1008). For example, the extraction, creation and categorization may be performed such that a level, at which, a contact appears in the hierarchy is dependent on how often that contact appears in the items. Within that level of the hierarchy, contacts may be grouped based on how often they appear together in the items.

In an implementation, keywords are created for representing groups of contacts to give context to a group of contacts instead of using a single contact as the "head" of a subhierarchy. For example, the keywords used to represent the group may be found by extracting keywords that are shared among the set of contacts.

The plurality of keywords is output for display in a user interface such that at least one of the displayed keywords is selectable to navigate to items having the keyword (block 1010). A client then selects one of the keywords (block 1012). In response to the selection, the keyword analysis module may output contact corresponding to the selected keyword and at least one other contact based on relative closeness of the at least one other contact to the contacts which correspond to the selected keyword (block 1014). In this way, the keyword analysis module may "suggest" an additional contact based on the past history of the client in dealing with the contact. For instance, the client may have a history of dealing with a group of contacts together. Therefore, when the client selects a keyword corresponding to one of the contacts, the rest of the contacts may be output for display and selection by the client.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented at a computing device having a processor, the method comprising:

processing, by the processor of the computing device, a plurality of items to extract a plurality of keywords contained in the items, the processing including forming two or more of the plurality of keywords into keyword phrases, wherein the processing is performed at least in part based on a relative closeness of the plurality of keywords, one to another, the relative closeness partially defining a relevancy of one of said items to another of said items;

forming a plurality of groupings of the keywords based on the relative closeness;

combining the plurality of groupings to build balanced keyword hierarchies that comprise a predetermined number of balanced top-level islands, the combining comprising:

organizing the plurality of groupings to create a plurality of small islands based on the relative closeness of the plurality of groupings;

reducing number of the plurality of small islands to form the predetermined number of top-level hierarchical islands, the reducing comprising:

combining the plurality of small islands to multiple high-level islands each having a hierarchy of a subset of the plurality of small islands, the multiple high-level islands having at least a first high-level island and a second high-level island;

determining that a set of small islands to be combined to the first high-level island will cause the first high-level island to include an unbalanced number of small islands;

maintaining the first high-level island balanced by moving the set of small islands to be combined to the second high-level island, wherein the second high-level island has less closeness value than the first high-level island, and repeating the combining, determining and maintaining until the predetermined number of top-level hierarchical islands are formed;

outputting one or more of the predetermined number of top-level hierarchical islands for display on a display device as arranged in one or more hierarchies such that at least one of the plurality of keywords is selectable on the display device, wherein the one or more of the predetermined number of top-level hierarchical islands include the keyword phrases;

receiving, from a user input via an input device, a selection of one of the plurality of keyword phrases; and navigating, at the computing device based on the selection, to a subset of the plurality of items that:
 are configured as emails; and
 include or relate to the one of the plurality of keywords.

2. A method as described in claim 1, wherein:
the processing includes forming two or more of the plurality of keywords into a keyword phrase; and
the outputting includes outputting the keyword phrase and at least one of the two or more of the plurality of keywords for display.

3. A method as described in claim 1, wherein the processing includes:
forming a single dictionary of keywords for the plurality of items; and
forming a dictionary of keywords for each said item.

4. A method as described in claim 1, wherein the plurality of items include instant messages, contacts, appointments and documents which are accessible on the client device.

5. A method as described in claim 1, wherein:
a plurality of the displayed keywords is concurrently selectable;
the receiving comprises receiving, from the user, concurrent selections of two or more of the plurality of the displayed keywords; and
the navigating comprises navigating to a subset of the plurality of items that include or relate to the two or more of the plurality of the displayed keywords that are selected by the user.

6. A method as described in claim 1, wherein the keywords may toggle between people keywords, non-people keywords, and both people keywords and non-people key words.

7. A method as described in claim 1, wherein a preview pane displays results of navigating a hierarchy of groupings concurrent with the navigating.

8. A method as described in claim 1 further comprising receiving a plurality of selections of keywords while a button is pressed, and navigating to emails having the plurality of selected keywords.

9. A method implemented at a client device having a processor, the method comprising:
extracting, at the computing device, a plurality of keywords from a plurality of items on the client device, the extracting comprising:
 determining a number of instances of each word contained in the plurality of items,
 determining a total number of words contained in the plurality of items,
 determining, for each of the plurality of items, a number of instances of each word contained in that item,
 determining, for each of the plurality of items, a total number of words contained in that item, and
 determining the plurality of keywords by selecting a number of the words each having a ratio that exceeds a threshold, wherein the ratio is calculated as $ratio = X/Y/a/b$ where:
X is the number of instances of the word contained in a particular item;
Y is the total number of words contained in the particular item;
a is the total number of instances of the word contained in the plurality of items; and
b is the total number of words found in the plurality of items;

automatically creating, at the client device, top-level hierarchies from the plurality of keywords, each of the top-level hierarchies having a plurality of keywords positioned at different hierarchical levels, the creating comprising:
 organizing the plurality of keywords to create a plurality of small hierarchies based on the relative closeness of the plurality of keywords;
 reducing number of the plurality of small hierarchies to form a predetermined number of top-level hierarchies, the reducing comprising:
  combining the plurality of small hierarchies to multiple high-level hierarchies each having a subset of the plurality of small hierarchies, the multiple high-level hierarchies having at least a first high-level hierarchy and a second high-level hierarchy;
  determining that a set of small hierarchies to be combined to the first high-level hierarchy will cause the first high-level hierarchy to include an unbalanced number of small hierarchies;
  maintaining the first high-level hierarchy balanced by moving the set of small hierarchies to be combined to the second high-level hierarchy, wherein the second high-level hierarchy has less closeness value than the first high-level hierarchy, and wherein the closeness value defines a relevancy of one of the plurality of small hierarchies to another one of the plurality of small hierarchies; and
  repeating the combining, determining and maintaining until the predetermined number of top-level hierarchies are formed; and
categorizing a collection of said items on the client device based on words contained in the respective items according to the created hierarchies for display at the client device.

10. A method as described in claim 9, wherein the plurality of items include email, instant messages, contacts, appointments, photos, music, videos and documents which are accessible on the client device.

11. A method as described in claim 10, wherein metadata is associated with one or more said items.

12. A method as described in claim 9, further comprising outputting one or more said keywords for display as arranged in the created hierarchies such that each said keyword is selectable to navigate to messages having that keyword.

13. A method as described in claim 12, wherein a plurality of the displayed keywords are concurrently selectable to navigate to messages having one or more of the selected keywords.

14. A method as described in claim 9, wherein:
the collection of said items are contacts;
at least one said keyword is generated to describe the collection of said items; and
the at least one said keyword is generated based on analysis of the collection of said items.

15. A method of producing a keyword hierarchy, the method being implemented at a computing device and comprising:
mapping, at the computing device, closeness of a plurality of keywords extracted from a plurality of items, one to another, the closeness partially defining a relevancy of one of the plurality of keywords to another of the plurality of keywords and the closeness being generated by:

for each one of the plurality of keywords:
  creating a hash table comprising information that includes:
    a number of the plurality of items having the one of the plurality of keywords as a root keyword;
    a number of a sum of ranks of the plurality of items that have the root keyword;
    a first structure pointing to the plurality of keywords that are likely included in the plurality of items that have the root keyword; and
    a second structure storing closeness value for each of the plurality of keywords in the first structure;
  assigning an inertia for each one of the plurality of keywords in the first structure;
  walking each one of the plurality of keywords in the first structure and adjusting its inertia based at least in part on likelihood of the plurality of items having the each one of the plurality of keywords as a keyword;
  calculating one or more steps that the each one of the plurality of keywords is away from the root keyword in distance and adjusting the inertia of the each one of the plurality of keywords based at least in part on the one or more steps;
  taking the each one of the plurality of keywords that are two or three steps away from the root keyword; and
  adding the current inertia of the each one of the plurality of keywords to the closeness value stored in the second structure each time the each one of the plurality of keywords in the first structure points back to the root keyword;
forming, at the computing device, a plurality of groupings of the keywords based on the mapped closeness, wherein the plurality of groupings include two or more of the plurality of keywords into keyword phrases;
combining the plurality of groupings based at least in part on closeness of the plurality of groupings until a predetermined number of groupings remain; and
outputting said keyword phrases corresponding to the plurality of groupings for display at the computing device such that each of the keyword phrases, when output, is configured to be selectable to navigate to one or more corresponding said items that have the keyword phrase.

16. A method as described in claim 15, wherein the predetermined number of groupings is defined as a range.

17. A method as described in claim 15, wherein the combining is performed such that the number of keywords contained in each said grouping is approximately balanced, one to another.

18. A method as described in claim 15, wherein at least two said keywords form a keyword phrase.

19. One or more computer readable storage media having stored thereon a plurality of executable instructions that, when executed by a computing device having one or more processors, configure the one or more processors to implement the method as recited in claim 1.

20. One or more computer readable storage media having stored thereon a plurality of executable instructions that, when executed by a computing device having one or more processors, configure the one or more processors to implement the method as recited in claim 9.

21. One or more computer readable storage media having stored thereon a plurality of executable instructions that, when executed by a computing device having one or more processors, configure the one or more processors to implement the method as recited in claim 15.

* * * * *